E. L. BROWNSON.
CAMERA.
APPLICATION FILED JULY 31, 1915.
1,190,717.
Patented July 11, 1916.
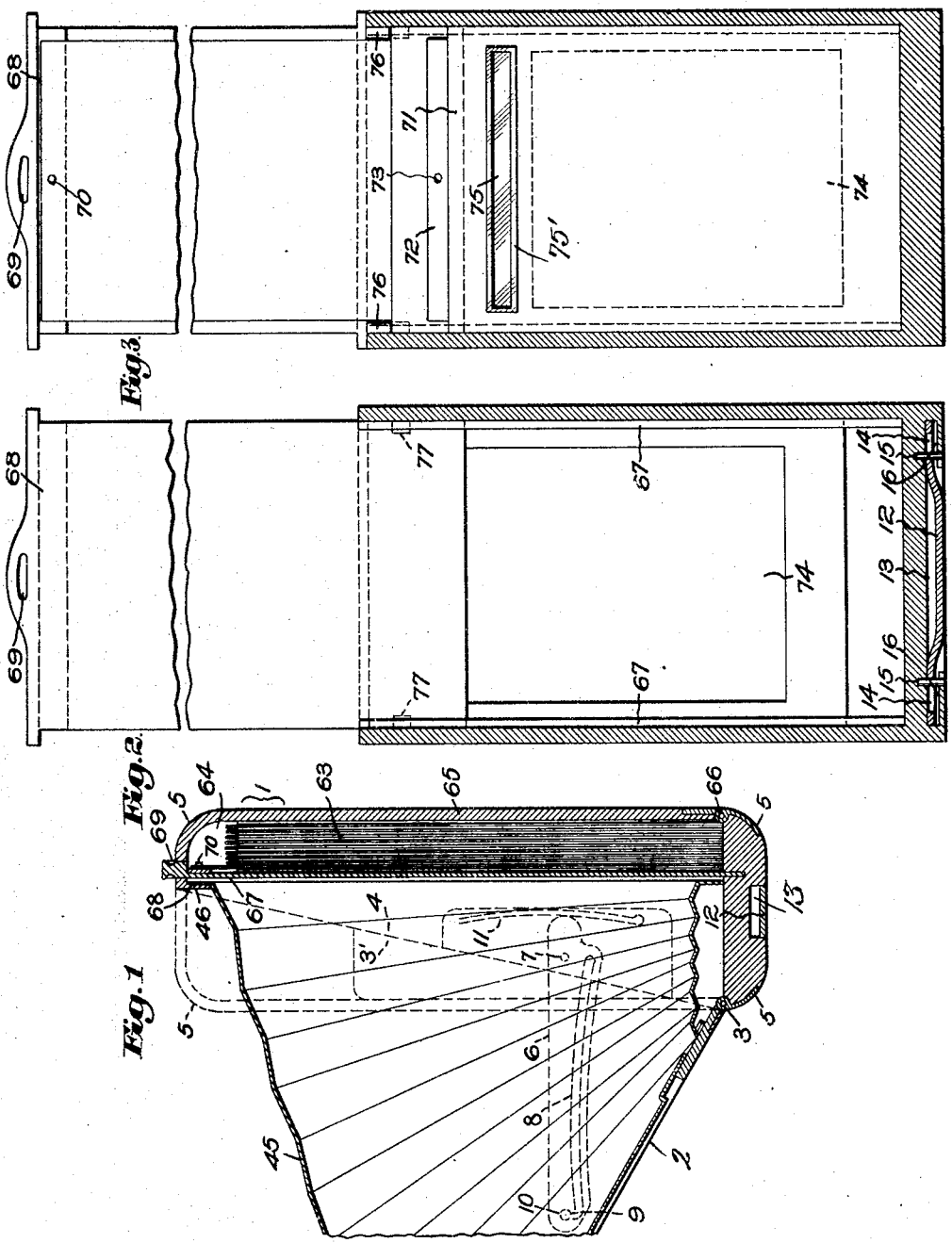
Inventor:
Earl L. Brownson,
by Emery, Booth, Janney and Varney
Attys.

UNITED STATES PATENT OFFICE.

EARL L. BROWNSON, OF ROCHESTER, NEW YORK.

CAMERA.

1,190,717.   Specification of Letters Patent.   Patented July 11, 1916.

Application filed July 31, 1915. Serial No. 42,909.

*To all whom it may concern:*

Be it known that I, EARL L. BROWNSON, a citizen of the United States, and a resident of Rochester, in the county of Monroe and State of New York, have invented an Improvement in Cameras, of which the following description, in connection with the accompanying drawings, is a specification, like characters on the drawings representing like parts.

This invention relates to cameras.

In order that the principles of the invention may be readily understood, I have disclosed a single embodiment thereof in the accompanying drawings, wherein—

Figure 1 is a vertical central section of a portion of a camera in an open position and embodying my invention. Fig. 2 is a vertical section taken through the camera in front of the slide thereof, the slide being up and the opening in the film holder ready for exposure; Fig. 3 is a vertical section, the back of the camera being down and one film slide being up.

The camera herein disclosed is particularly adapted for use in connection with chirographic film holders, such as shown in my co-pending application Serial No. 858,531, filed August 23, 1914, but is not limited to such use so far as certain features of the invention are concerned.

I contemplate the provision of an inexpensive camera, the parts of which may be compacted into small compass.

Other objects of the invention will more fully appear hereinafter.

Referring more particularly to the drawings, I have shown a case formed of any suitable material, but preferably of wood covered with leather. I may, however, if desired employ aluminum or other suitable metal. In the disclosed embodiment of the invention, I have represented the camera case as of general elongated box form and composed of two members 1, 2 hinged together at 3. Preferably the side walls 3', 4 of the case are oppositely sloped, as indicated in dotted lines in Fig. 1. While the camera case may be of any suitable shape, I preferably provide it with rounding or curved corners 5 at both ends thereof.

In order to hold the camera case in either open or closed position, I preferably provide the member 1 with a strip 6 preferably of thin sheet metal pivoted at 7 at the inside of said member 1. Said strip is provided with an elongated slot 8 in which rides a pin 9 projecting from the inside of the member 2. The slot 8 has an offset portion 10 with which said pin 9 engages when the camera case is in an open position as indicated in Fig. 1.

For carrying the camera I preferably provide a strap 12 shown in Figs. 1 and 2. Said strap is inserted and secured within a recess 13 in a wall of the camera and preferably an end wall thereof. As shown in Fig. 2, the said recess is provided with undercut portions 14 adapted to receive the ends of the strap. Pins or studs 15 are provided which extend through the undercut portions 14 of the recess 13 and are received in the wall of the case. The strap 12 is provided at its opposite end portions with longitudinal slots 16. The pins or studs 15 pass through said slots, and the construction is such that the strap may be positioned substantially flatwise, or may be drawn out sufficiently to permit the fingers to enter beneath the same and secure a hold thereon. Thus the strap may be positioned flush with or below the surface of the camera case.

The bellows of the camera is indicated generally at 45 in Fig. 1. At its inner end it is secured to a rectangular frame 46, itself secured to the member 1 of the case.

The camera is particularly adapted for use in connection with a plurality of films, but may be used with plates. Preferably I provide film holders, of which a plurality are indicated at 63 in Fig. 1. These film holders are not shown in detail, but are each preferably of the character shown in my said co-pending application. The said pack or series of film holders is adapted to be inserted in a space 64 at the rear of the camera to which access is had through a hinged wall 65, shown in Fig. 1. The said wall is here represented as hinged at 66 at the lower end of the member 1 of the camera case.

The member 1 of the camera case is provided with suitable guideways 67, which may be and preferably are spaced pieces secured to the inner wall of said member 1 of the camera case. Within said guideways is adapted to move a slide 68 shown in elevated position in Figs. 2 and 3, and preferably provided with an opening 69 at its upper end permitting ready seizure thereof. The said slide is provided with any suitable means for engagement with the slide of the operative film holder,—that is, the film holder positioned next to said slide 68. For this purpose I may employ any suitable device or structure, but preferably I provide said slide 68 with a single pin 70 positioned substantially centrally between the sides of said slides.

Each film holder comprises among its parts a carrier 71 indicated generally in Fig. 3 and a carrier slide 72. The latter is provided with a small opening 73 in line with and adapted to receive the pin 70. The film carrier which may be of the duplex character disclosed in my said application is provided in its front wall or portion with an opening 74 for the exposure of the film secured or contained therein and preferably in its rear wall with opening 75 having a transparent covering or sheet 75' on which at any desired time may be written or printed data indicative of the exposure, as, for example, some words describing the scene.

The inner surface of the camera case member 1 is provided with two suitable blocks 76 which are designed to limit the preferably slight upward or outward movement of the film carrier, so that upon continued movement of the main slide 68 and the film slide 72, the film carrier may not move unduly therewith. Preferably I permit a slight upward or outward movement of the film carrier, so as to prevent entrance of light at the lower portion of the carrier. The said blocks not only constitute stop devices for the active film carriers, but also limiting devices for the slide 68, which in Fig. 2 is represented as having opposite blocks, lugs or projections 77. In the outward or upward movement of said slide 68, said blocks 77 engage the blocks 76 and prevent the complete withdrawal of said slide 68.

Preferably each carrier 63 has an inner sensitive surface, preferably a film. After the exposure in the described manner of the film in the carrier 63 nearest to the slide 68, said carrier is removed from its active position and placed at the outside of the pack, thus bringing the next innermost carrier into contact with the slide 68, where it becomes the active carrier. This operation is continued until the films of all the carriers have been exposed when the pack may be removed and another pack or series of carriers may be inserted.

It will be evident from the foregoing description that the camera is of exceedingly simple and compact structure and yet is complete. It is adapted for a variety of work. Obviously, the camera may be employed with a tripod, but preferably it is adapted for use in the manner described, and when in closed condition may be readily carried in the pocket. The film holders may be readily inserted and the camera may be of suitable size to permit the carrying of a substantially larger number of film holders within the case. The construction is such that each film may be readily exposed by the movement of the slide 68 and the slides of the film carriers may be readily disengaged from the main slide 68, so as to permit the use of the successive film carriers 63. Obviously each film may be exposed through the opening 75 in the film carrier either before the picture is taken or at any time thereafter. It is not necessary therefore to write upon the transparent member covering the opening 75 at or substantially at the time when the picture is taken. This feature of the camera possesses numerous advantages which are set forth more fully in my co-pending application.

One film may be exposed and at once removed from the camera without disturbing the rest of the pack. This feature is particularly desirable for newspaper work, or in any case where it is desirable to take a picture and develop it at once. This cannot be done with roll films.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A camera case having guideways, an exposure slide adapted to said guideways, a sensitive surface carrier having a slide, means to secure unison movement of said slides, means to retain said carrier in position during movement of said slides, and means to prevent complete withdrawal of said exposure slide from the camera case.

2. A camera provided with an exposure slide sufficiently spaced from the rear wall of the camera to permit the insertion of a plurality of sensitive surface carriers, a plurality of sensitive surface carriers each provided with a slide, and means for effecting conjoint or unison movement of the exposure slide and the next adjacent sensitive surface carrier slide.

3. A camera provided with an exposure slide sufficiently spaced from the rear wall of the camera to permit the insertion of a plurality of sensitive surface carriers. guideways for said slide, and a plurality of sensitive surface carriers, each having a slide, each of said sensitive surface carrier slides having means for effecting temporary interengagement with the exposure slide.

4. A camera provided with an exposure slide sufficiently spaced from the rear wall of the camera to permit the insertion of a plurality of sensitive surface carriers, guideways for said slide, a plurality of sensitive surface carriers each having a slide, each of said sensitive surface carrier slides having means for effecting temporary interengagement with the exposure slide, and means to retain the active sensitive surface carrier in position during movement of its slide.

5. A camera provided with an exposure slide sufficiently spaced from the rear wall of the camera to permit the insertion of a plurality of sensitive surface carriers, guideways for said slide, a plurality of sensitive surface carriers each having a slide, each of said sensitive surface carrier slides having means for effecting temporary interengagement with the exposure slide, means to retain the active sensitive surface carrier in position during movement of its slide, and means to prevent complete withdrawal of the exposure slide from the camera case.

6. A camera having walls thereof provided with guiding means, an exposure slide guided thereby, said exposure slide being sufficiently spaced from the permanent rear wall of the camera to permit the insertion of a plurality of sensitive carriers between said permanent rear wall and said exposure slide, a sensitive surface carrier positioned between said exposure slide and said permanent rear wall of the camera and having a slide, and means for effecting conjoint or unison movement of said exposure slide and the sensitive surface carrier slide.

7. A camera having walls thereof provided with guiding means, an exposure slide guided thereby, a permanent rear wall of the camera being spaced from said slide, a plurality of sensitive surface carriers positioned between said permanent rear wall and said exposure slide, each of said sensitive surface carriers being provided with a slide, and means for effecting conjoint or unison movement of the exposure slide and the next adjacent surface carrier slide.

8. A camera having the side walls thereof provided with grooves, an exposure slide fitted to said grooves, the rear wall of the camera being sufficiently spaced from said exposure slides and movable to permit the simultaneous insertion of a series of sensitive surface carriers, each of said sensitive surface carriers being provided with a slide, and means for effecting conjoint or unison movement of the exposure slide and the next adjacent sensitive surface carrier slide.

9. A camera having guides, an exposure slide fitted to said guides, stop means to prevent the entire withdrawal of said exposure slide from the camera, the rear wall of the camera being spaced from the exposure slide, a sensitive surface carrier positioned between said exposure slide and the rear wall of the camera and having a slide, and means to effect conjoint or unison movement of the exposure slide and the sensitive surface carrier slide.

10. A camera having guiding means, an exposure slide fitted thereto, the rear wall of the camera being spaced from said exposure slide, a sensitive surface carrier positioned between the exposure slide and the rear wall of the camera, and stop means to prevent the entire withdrawal of said exposure slide and the sensitive surface carrier slide.

11. A camera having guiding means, an exposure slide fitted thereto, the rear wall of the camera being spaced from said exposure slide, a sensitive surface carrier positioned between the exposure slide and the rear wall of the camera, stop means to prevent the entire withdrawal of said exposure slide and the sensitive surface carrier slide, and means for effecting conjoint or unison movement of said slides.

12. A camera provided with guiding means, an exposure slide fitted thereto, the rear wall of the camera being spaced from said exposure slide, a sensitive surface carrier positioned between said rear wall and said exposure slide and having a slide, stop means to prevent the entire withdrawal of the exposure slide, and undue movement of the sensitive surface carrier, and means for effecting conjoint or unison movement of the said slides.

13. A camera provided with guides having an exposure slide fitted thereto, a rear wall of the camera being spaced from said exposure slide, a sensitive surface carrier positioned between said exposure slide and the rear wall of the carrier, said carrier having in its front wall an exposure opening and in its rear wall an opening with a translucent covering, a slide for said carrier, and means for effecting conjoint movement of said slides.

14. A camera having guiding means, an exposure slide 68 fitted to said guiding means, the camera having a hinged rear wall 65 spaced from said exposure slide, a plurality of sensitive surface carriers 71 positioned between said exposure slide and the rear wall of the camera, each of said carriers having a slide 72, and means for effecting conjoint or unison movement of the exposure slide and the carrier slide next adjacent thereto.

In testimony whereof, I have signed my name to this specification, in the presence of two subscribing witnesses.

EARL L. BROWNSON.

Witnesses:
   IRVING U. TOWNSEND,
   MAY H. LOWRY.